United States Patent
Yamashita

[11] Patent Number: 5,927,112
[45] Date of Patent: *Jul. 27, 1999

[54] THEFT DETECTION MECHANISM AND ANTI-THEFT DEVICE FOR VEHICLE

[75] Inventor: Akihiko Yamashita, Saitama, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/824,115

[22] Filed: Mar. 26, 1997

[30] Foreign Application Priority Data

Mar. 26, 1996 [JP] Japan .................................. 8-070559

[51] Int. Cl.⁶ .................................................. E05B 65/12
[52] U.S. Cl. .............................................. 70/252; 70/419
[58] Field of Search ............................. 70/183–186, 233, 70/252, 416, 419, 420, 423, 455, 387, 424, 427, 428, 441, 453, 360, 215–217, 223; 340/542; 307/10.3, 10.6

[56] References Cited

U.S. PATENT DOCUMENTS

| | | | |
|---|---|---|---|
| 2,623,959 | 12/1952 | Jarrett | 70/441 |
| 3,520,161 | 7/1970 | Jacobi | 70/372 |
| 3,685,036 | 8/1972 | Torok | 340/274 |
| 3,723,677 | 3/1973 | Arias | 200/44 |
| 3,797,004 | 3/1974 | Muessel | 340/274 |
| 3,962,695 | 6/1976 | Peters | 300/542 |
| 4,036,039 | 7/1977 | Nakanishi | 70/217 |
| 4,052,869 | 10/1977 | Weber | 70/455 |
| 4,985,693 | 1/1991 | Sunami | 340/542 |
| 5,229,747 | 7/1993 | Zhao | 340/542 |
| 5,291,067 | 3/1994 | Nakajima | 70/252 |
| 5,307,658 | 5/1994 | Kokobu | 70/427 |
| 5,404,735 | 4/1995 | Hsieh | 70/441 |
| 5,410,898 | 5/1995 | Shieh | 70/DIG. 49 |
| 5,530,427 | 6/1996 | Shieh | 340/542 |
| 5,563,387 | 10/1996 | Myers | 70/455 |
| 5,673,575 | 10/1997 | Carlo | 70/416 |

FOREIGN PATENT DOCUMENTS

| | | |
|---|---|---|
| Y2-57-27669 | 6/1982 | Japan . |
| 200048 | 9/1986 | Japan .................................. 340/342 |
| A-7223508 | 8/1995 | Japan . |

*Primary Examiner*—Steven Meyers
*Assistant Examiner*—Gary Estremsky
*Attorney, Agent, or Firm*—Birch, Stewart, Kolasch & Birch, LLP

[57] ABSTRACT

A theft detection mechanism is provided with a top ring which is depressed when a foreign object other than a key is inserted into a key inserting hole. A sensor is provided for detecting that the top ring is depressed. A top ring is inevitably pushed down when a foreign object other than a key is inserted into a key inserting hole to activate the sensor, thereby reliably detecting a stealing action. Moreover, the structure of a theft detection mechanism is made simple to reduce the cost thereof.

20 Claims, 6 Drawing Sheets

THEFT DETECTION MECHANISM AND ANTI-THEFT DEVICE FOR VEHICLE

BACKGROUND OF THE INVENTION

1. Field of the Invention

The present invention relates to a theft detection mechanism and an anti-theft device for a vehicle.

2. Description of Background Art

Anti-theft devices for a vehicle include 1) a device which has a sensor for sensing vibration, infrared rays, ultrasonic sound or the like or a circuit for detecting a break in a specific circuit near a steering wheel and sounds an alarm by the signal of the above described sensors or circuit when a theft is carried out, 2) an anti-theft alarm device for a motorcycle as described in Japanese Unexamined Utility Model Publication No. 57-27669 and 3) an alarm device for a motorcycle as described in Japanese Unexamined Patent Publication No. Hei 7-223508.

In the above described prior art 2), the anti-theft alarm device has an alarm circuit and an engine ignition circuit which are selectively turned on or off by a selector switch and sounds an alarm when the alarm circuit is selected by the selector switch and an alarm switch attached on a handle grip is turned on by gripping the handle grip.

In the above described prior art 3), the alarm device is set in a state in which an ignition switch is set at an alarm position and a key is taken out from the alarm position and the vehicle body is held using a stand. When the stand is moved to a stored position by a third person, an alarm sounding device is energized by a stand switch attached on the stand to sound an alarm.

The sensors of the anti-theft device of the prior art 1) described above have an inconvenience with regard to sounding an alarm, for example, when the vehicle body is touched and the vibration is mistaken for a theft of the vehicle even though the theft is not carried out or when and individual forgets to turn off a switch for activating the above described sensors. Moreover, the sensors described above have an inconvenience of having a complex, expensive mechanism.

The prior art 2) and 3) described above have a problem wherein a switch attached on a handle grip or a stand is activated to sound an alarm due to carelessness when the theft is not carried out.

SUMMARY AND OBJECTIONS OF THE INVENTION

An object of the present invention is to provide a theft detection mechanism which is hard to activate in the case of other than a theft and detects the theft with reliability and reduces the cost thereof. An anti-theft device is provided which includes the theft detection mechanism.

In order to accomplish the above described object, a theft detection mechanism of the present invention comprises a top ring which is depressed when an object other than a key is inserted into a key inserting hole and a sensor for detecting that the sensor is depressed.

When an object other than a key is inserted into a key inserting hole, the top ring is inevitably pushed down to activate the sensor, thereby reliably detecting a stealing action. Moreover, this theft detection mechanism has a simple structure to reduce the cost thereof.

An anti-theft device for a vehicle comprises a theft detection mechanism for a vehicle and a theft alarm mechanism for sounding an alarm by a signal from the theft detection mechanism of a vehicle. The theft alarm mechanism can make the stealing action known to the surroundings, thereby improving the effect of preventing the theft.

An anti-theft device for a vehicle comprises a theft detection mechanism for a vehicle and an ignition prohibiting mechanism for prohibiting ignition by a signal from the theft detection mechanism of a vehicle.

When a stealing action is detected, the engine cannot be started, thereby making it difficult to steal the vehicle.

An anti-theft device for a vehicle comprises an anti-theft detection mechanism for a vehicle and an ignition prohibiting mechanism for prohibiting ignition by a signal from the theft detection mechanism of a vehicle.

When the stealing action is detected, the engine can not be started, thereby making it difficult to steal the vehicle.

An anti-theft device for a vehicle comprises a theft detection mechanism for a vehicle and a stealing action detection mechanism provided with at least one of a vibration sensor, an ultrasonic sensor, an infrared sensor and an electric circuit break detection circuit mounted on the body of the vehicle for detecting the stealing action. Various kinds of stealing actions are reliably detected by the different functions of the various kinds of sensors.

An anti-theft device for a vehicle comprises the anti-theft detection mechanism for the vehicle and a theft alarm mechanism for sounding an alarm by a signal from the theft detection mechanism or the stealing action detection mechanism for the vehicle.

The stealing actions can be reliably detected by the different functions of the various kinds of sensors and the effect of preventing a theft can be improved by the theft alarm mechanism.

An anti-theft device for a vehicle comprises the anti-theft detection mechanism for a vehicle and an ignition prohibiting mechanism for prohibiting ignition by a signal from the stealing action detection mechanism or the theft detection mechanism for the vehicle.

When a stealing action is detected, the engine can not be started, thereby making it difficult to steal the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
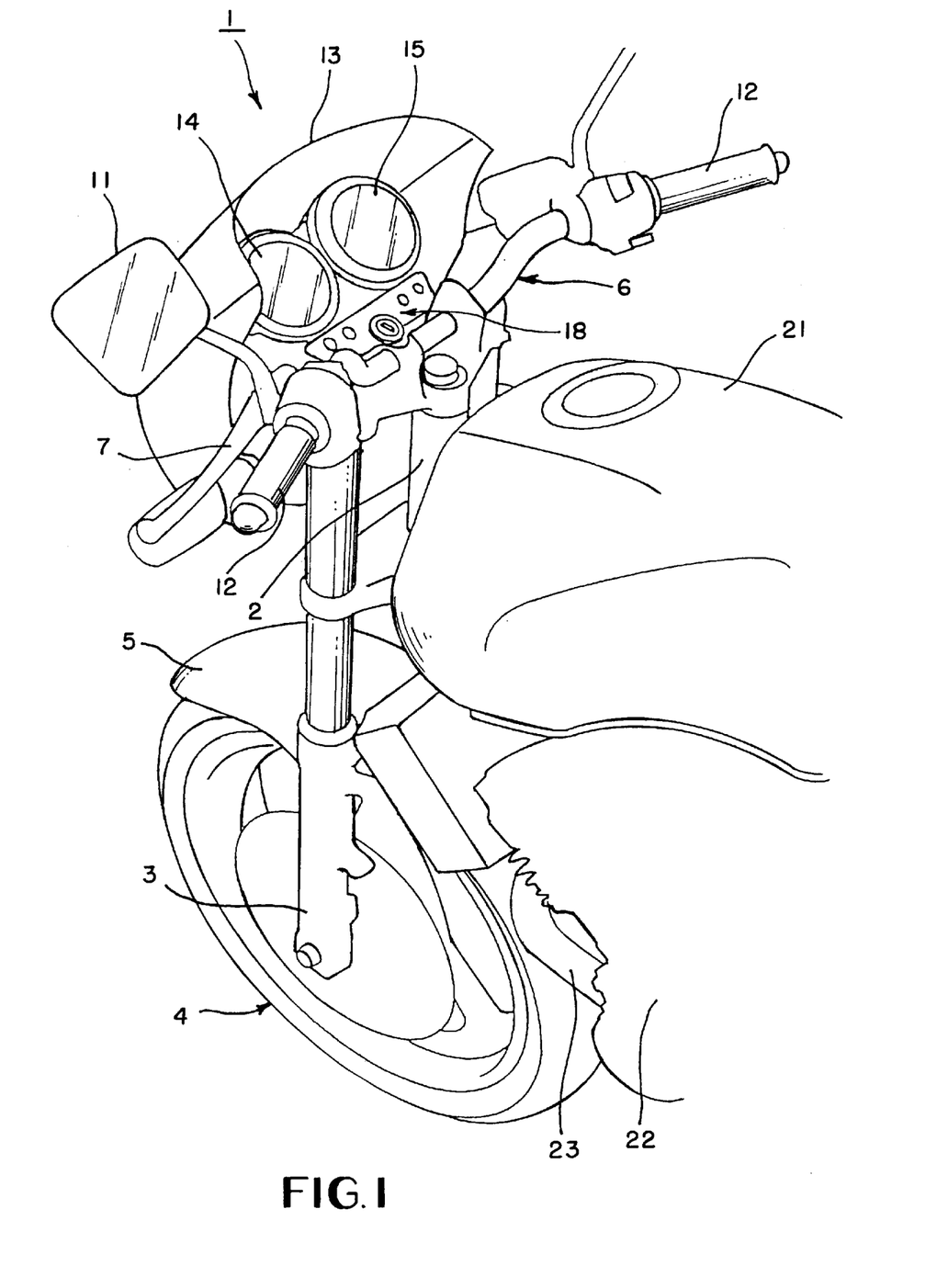
FIG. 1 is a perspective view of a front part of a motorcycle provided with a handle lock device according to the present invention.

FIG. 1 is a perspective view of the front part of a motorcycle provided with a handle lock device according to the present invention. The motorcycle 1 is provided with a steering head 2 mounted on the front part of a frame not shown in the drawing. A front fork 3 is mounted on the steering head 2 swinging via a handle post not shown in the drawing. A front tire 4 is provided with a wheel mounted at the end of the front fork 3. A front fender 5 covers the upper part of the front tire 4. A handle 6 integrally swinging the front fork 3, clutch levers 7 and front brake levers (not shown in the drawing) and back mirrors 11, 11 (right-side mirror is not shown in the drawing) mounted on the right side and the left side of the handle 6. Grips 12, 12 are mounted on the right side and the left side of the handle 6. A main switch 18 is mounted on the front part of the steering head 2 which includes a windshield 13, a speedometer 14, a tachometer 15 and a handle lock device 16, see FIG. 3. A fuel tank 21 is mounted on the upper part of the frame in the rear of the steering head 2. An engine 22 is mounted on the frame under the fuel tank 21. An exhaust pipe 23 extends from the front part of the engine 22.

Figure 2:
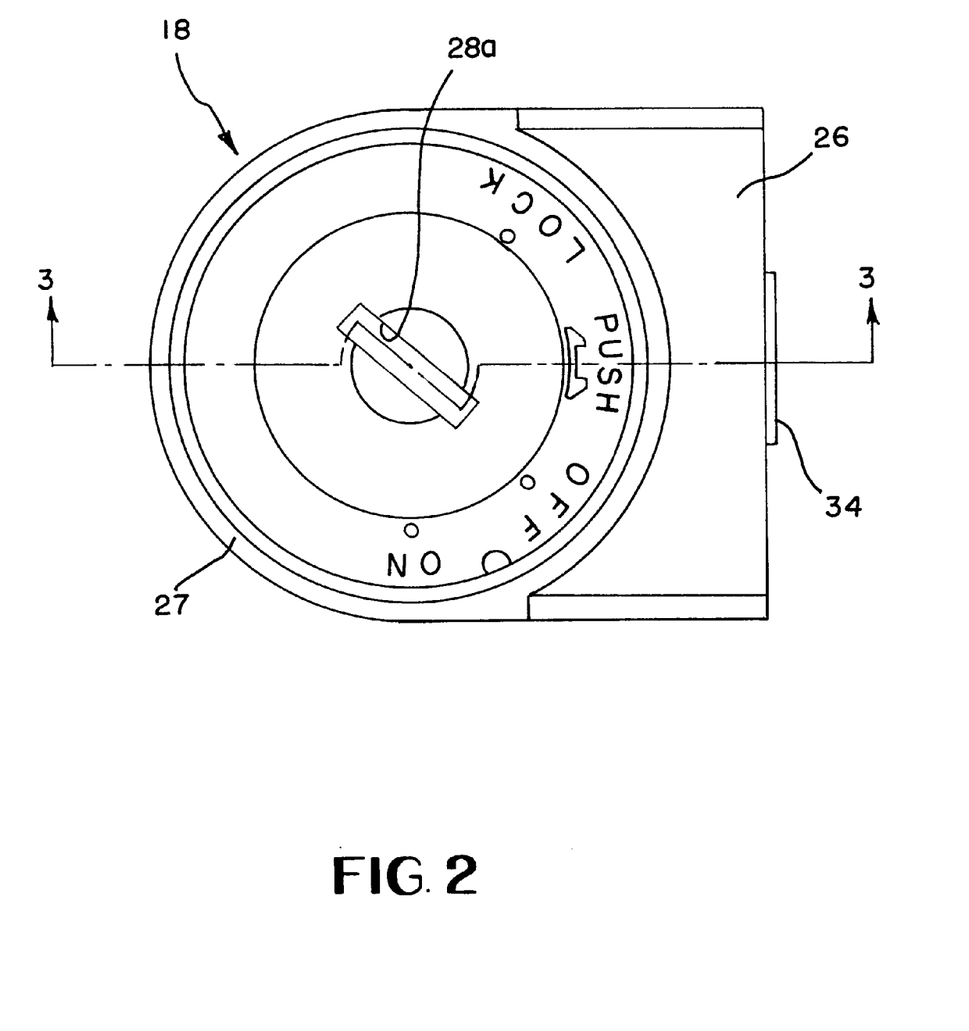
FIG. 2 is a plan view of a main switch provided with a handle lock device according to the present invention.

FIG. 2 is a plan view of the main switch having the handle lock device according to the present invention. The main switch 18 has on the surface thereof a key hole 28a and indicators for OFF, ON, PUSH and LOCK for indicating the rotated positions of the key K, see FIG. 4(a).

When the key is at the OFF position, the engine is stopped and the handle is in an unlocked position and the key can be inserted in the key hole.

When the key is turned to the ON position, the engine is in a state for starting and can start if a starting switch is turned on. Of course, the handle is in an unlocked state.

When locking the handle, in FIG. 1, turn the handle 6 to the left or the right to the limit and insert the key K of the main switch 18 at the position of OFF and then turn the key K counterclockwise to the position of LOCK, in FIG. 2. The key K is returned to the position of the original height by a pushing-up force from below and then the handle is locked. The key K can be taken out at this LOCK position.

Figure 3:
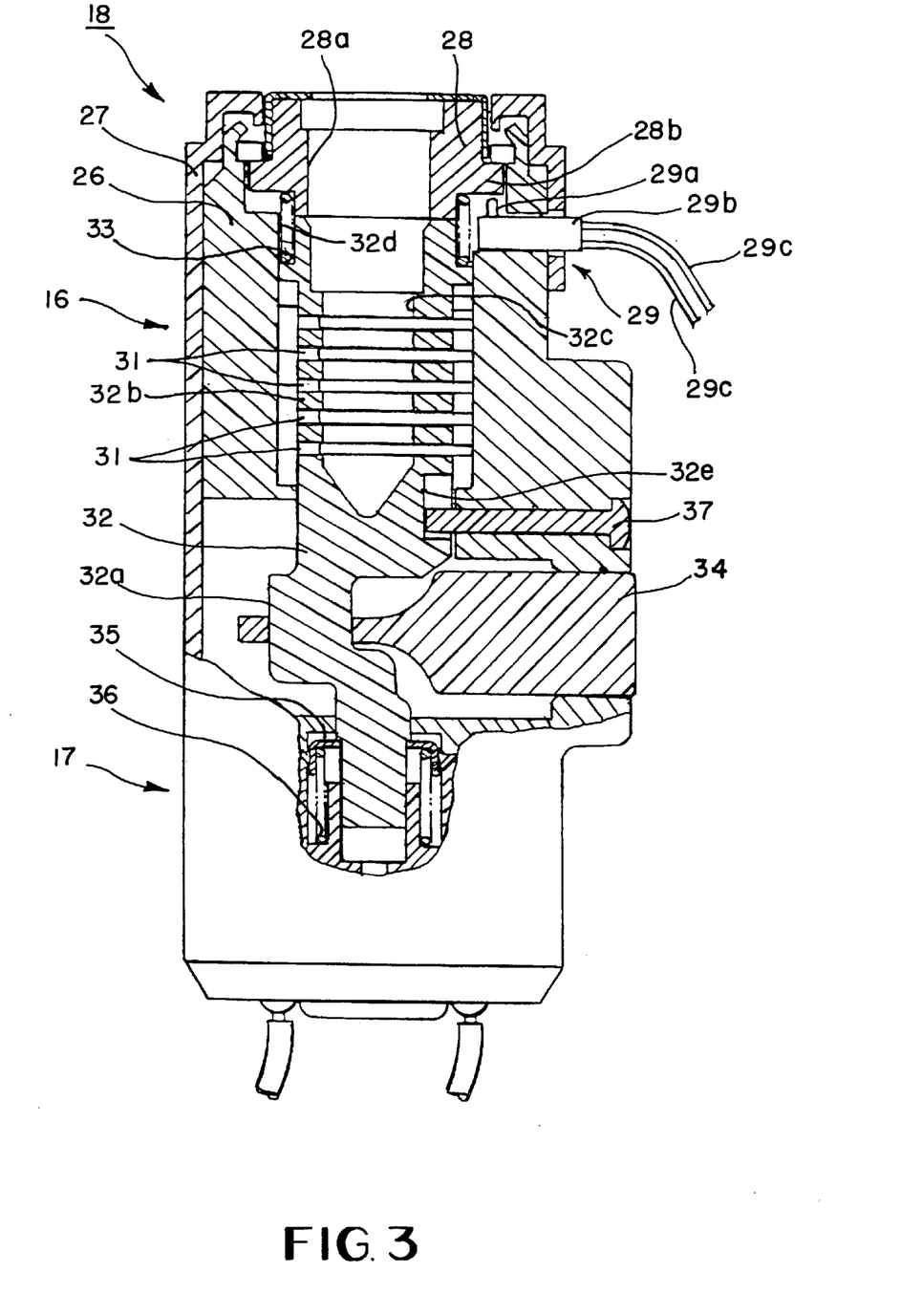
FIG. 3 is a sectional view taken on a line 3—3 in FIG. 2.

FIG. 3 is a sectional view taken on a line 3—3 in FIG. 2 and shows a state in which the key is in an OFF position. The main switch 18 comprises an upper handle lock device 16 and a lower ignition switch section 17.

The handle lock device 16 comprises a lock outer cylinder 26 attached to a vehicle body. A cover 27 is provided for covering the lock outer cylinder 26. A top ring 28 is housed rotatably and movably up and down in the upper part of the lock outer cylinder 26 and includes a key hole 28a. A sensor 29 having projection 29a abutting on the bottom surface of the lower flange 28b of the top ring 28 is moved down to detect the depression of the top ring 28. A crank shaft 32 is provided with tumblers 31 . . . ( . . . shows a plurality of items. The same applies to the following.) housed in the lower part of the top ring 28 rotatably and movably up and down and retracted in a straight part 32b by inserting the key K, see FIG. 4(a), into a key inserting hole 32c of the straight part 32b of the upper part of the crank part 32a. A coil spring 33 is disposed in an annular groove 32d formed in the upper part of the crank shaft 32 and pushes up the top ring 28. A lock pin 34 is locked or unlocked by the crank part 32a of the crank shaft 32. A coil spring 36 pushes up the crank shaft 32 via a retainer 35. A control pin 37 is fixed on the key outer cylinder 26 whose tip end is inserted into a cam groove formed in the side of the crank shaft 32 and for controlling up-and-down movement and rotation of the crank shaft 32.

The sensor 29 is connected to theft alarm mechanisms 42, 52 described below and turned on when the projection 29a is moved down, thereby activating the theft alarm mechanisms 42, 52 to sound an alarm In this respect, 29b is a main body of the sensor 29 and 29c and 29c are lead wires.

An action of the handle lock device described above is described as follows.

Figure 4A:
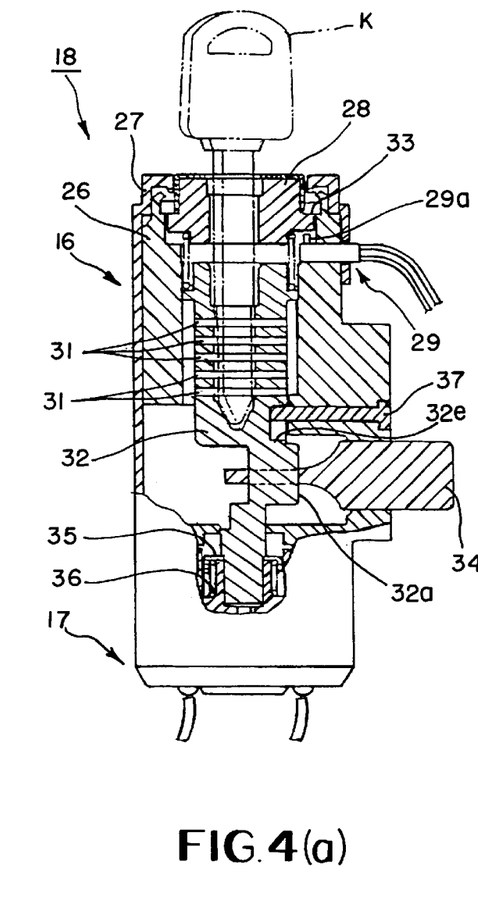
FIG. 4(a) is a sectional view of a handle locking device according to the present invention in a locked position.
Figure 4B:
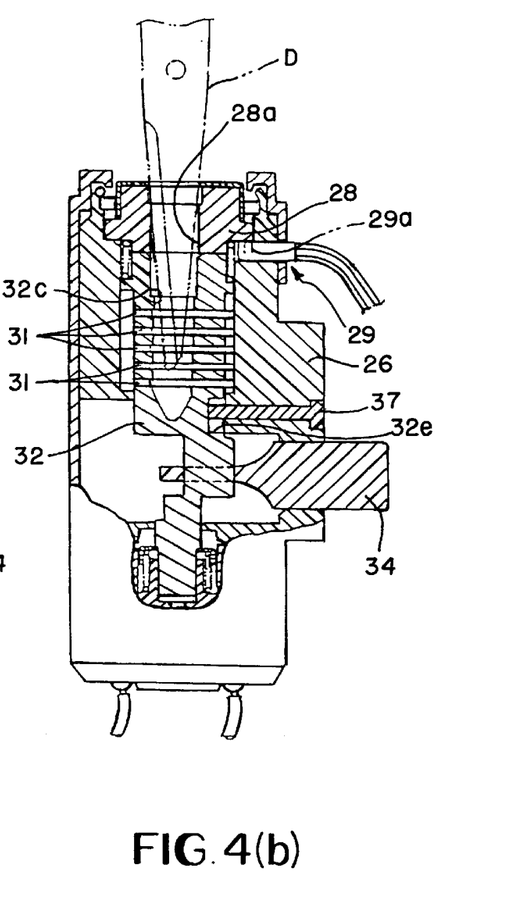
FIG. 4(b) is a sectional view of a handle locking device with a foreign object inserted into the key hole.

FIGS. 4(a) and 4(b) are sectional views of the handle lock device according to the present invention in a locked position. FIG. 4(a) shows a state in which a key is inserted and FIG. 4(b) shows a state in which a foreign object is inserted into the key hole.

In FIG. 4(a), if the key is turned counterclockwise to a LOCK position with the key pushed in a position of OFF shown in FIG. 2, the crank part 32a of the crank 32 is moved from the left to the right in the drawing and then one end of the lock pin 34 engaging with the crank part 32a is moved from the left to the right in the drawing to protrude from the inside of the handle lock device to the outside thereof. In this state the top ring 28 is not depressed and thus the projection 29a of the sensor 29 is not moved down nor turned on.

In FIG. 4(b), when the handle is locked and a foreign object D such as a pair of scissors, a screw driver or the like is inserted into a key hole 28a, it is difficult to turn the crank shaft 32 forcefully because the tumblers 31 are engaged with the key outer cylinder 26 and the cam shaft 32e formed on the crank shaft 32 is engaged with the control pin 37. In this case, if the crank shaft 32 is pushed down, the cam shaft 32e formed on the crank shaft 32 is disengaged from the control pin 37 and thus only the tumblers 31 are engaged with the key outer cylinder 26. But when the foreign object D is pushed in the key hole, the top ring 28 is depressed and thus the projection 29a of the sensor 29 is moved down to turn on the sinking sensor 29 and thus to activate the theft alarm mechanisms 42, 52, see FIG. 5, FIG. 6, thereby sounding an alarm and preventing the theft.

As described above, a stealing action of turning the crank shaft 32 by inserting a foreign object D inevitably depresses the top ring 28 and thus is reliably detected by the sensor 29. Moreover, in the normal use of the motorcycle, there is no possibility that the top ring 28 is depressed therefore an alarm is not sounded by mistake.

Figure 5:
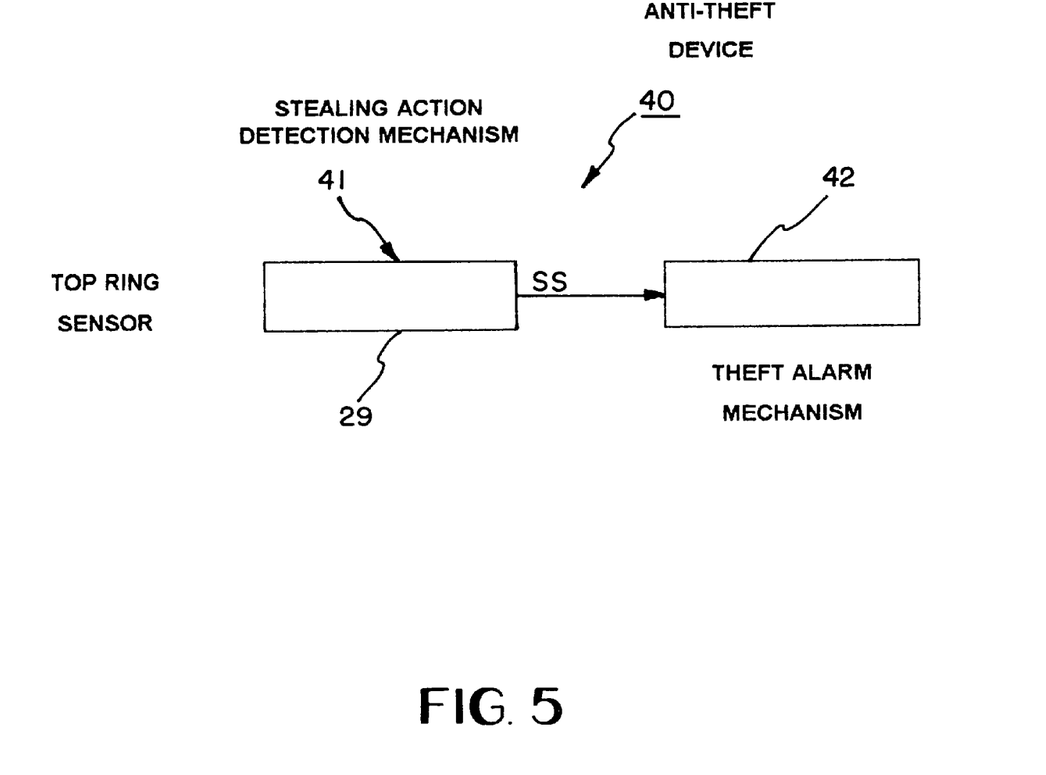
FIG. 5 is a block diagram of an anti-theft device according to the present invention.

FIG. 5 is a block diagram of an anti-theft device according to the present invention. The anti-theft device 40 comprises a stealing action detection mechanism 41 provided with a top ring sensor 29 and a theft alarm mechanism 42 for sounding an alarm based on a signal SS from the stealing action detection mechanism 41, a signal based on the depression of the top ring 28.

Since the anti-theft device 40 is simply composed as described above, it is not expensive and thus may be applied to an inexpensive motorcycle. Moreover, it can reliably detect a stealing action.

Figure 6:
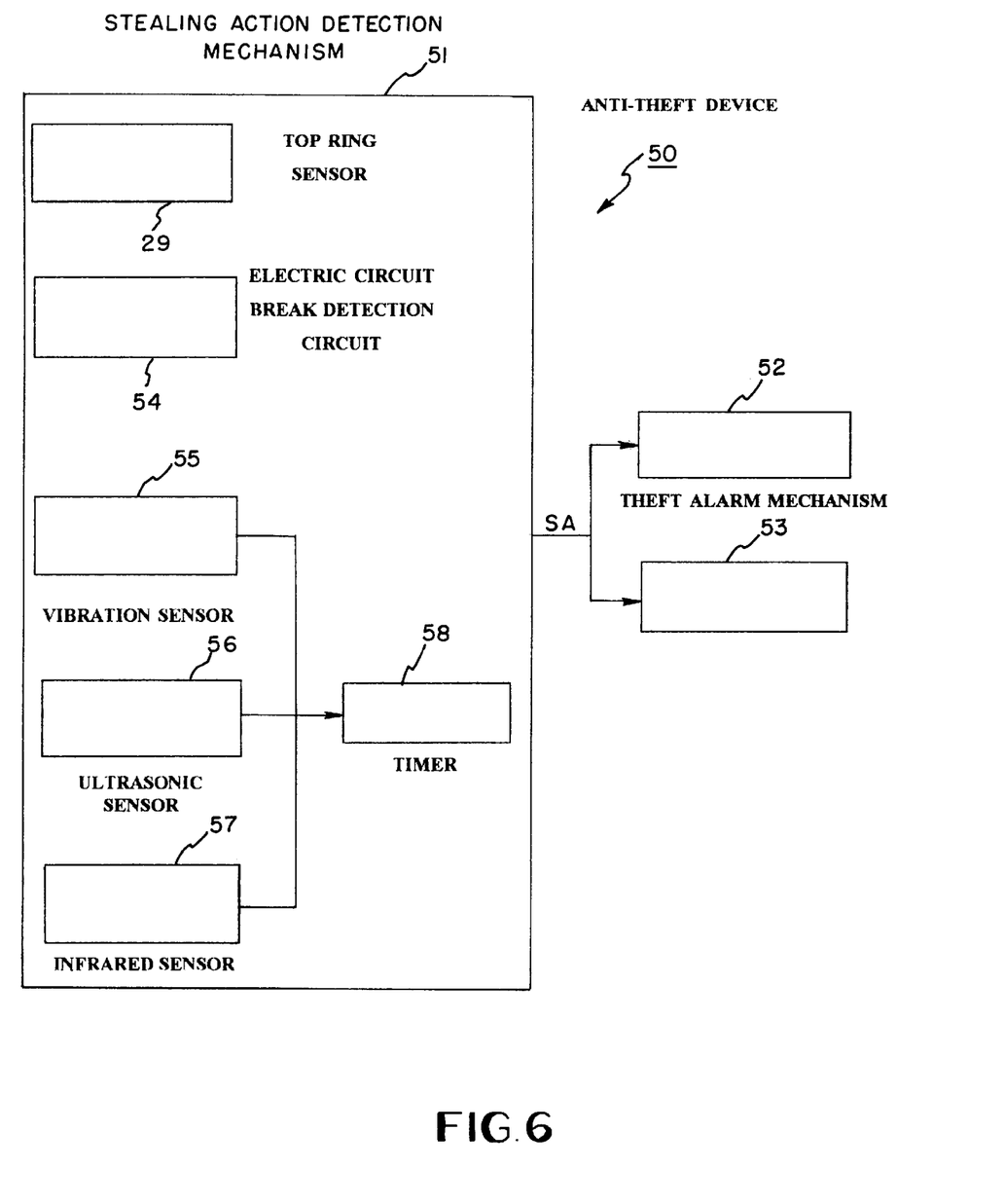
FIG. 6 is a block diagram of another example of an anti-theft device according to the present invention.

FIG. 6 is a block diagram of another example of an anti-theft device according to the present invention. The anti-theft device 50 comprises a stealing action detection mechanism 51 including various kinds of sensors, a theft alarm mechanism 52 for sounding an alarm based on a signal SA from the stealing action detection mechanism 51 and an ignition prohibiting mechanism 53 for prohibiting the engine mounted on the vehicle from igniting based on the signal from the stealing action detection mechanism 51.

The stealing action detection mechanism 51 comprises a top ring sensor 29, at least one of or a plurality of an electric circuit break detection circuit 54 for detecting a break in a wire connected to an ignition switch, a vibration sensor for detecting the vibration of the vehicle, an ultrasonic sensor for detecting movement of the vehicle with ultrasonic sound and an infrared rays sensor 57 for detecting the movement of the vehicle with infrared rays, and a timer 58 for setting the time required to start working the vibration sensor 55, the ultrasonic sensor 56 and the infrared sensor 57.

An action of another example of the stealing action detection mechanism described above is described as follows. The following actions are thought of as stealing actions.

1) To cut a wire connected to an ignition switch with a nipper or the like and to connect the wire to complete a state of ignition on.

2) To break a handle lock device with tools to unlock it.

3) To move the whole vehicle with a locked handle lock device.

The above described stealing action 1) is detected by the electric circuit break detection circuit 54.

As for the above described stealing action 2), inserting a foreign object into the key hole is detected by the sensor 29 and vibrations are detected by the vibration sensor 55.

As for the above described stealing action 3), the movement of the vehicle is detected by the ultrasonic sensor 56 or the infrared sensor 57. In this case, both sensors 56 and 57 measure the distance to the object such as the surface of the road or the like and detect the change in the distance. However, it is difficult for the ultrasonic sensor 56 to detect the change in the distance if the object is a sound-absorbing material and it is also difficult for the infrared sensor 57 to detect the change in the distance if the object has a shine or an infrared radiating section is made dirty.

As described above, both sensors 56 and 57 have defects described above but it is possible to detect a stealing action by compensating the defects with combining these sensors.

The stealing action detection mechanism 51 sends a signal SA to the theft alarm mechanism 52 and the ignition prohibiting mechanism 53 by the detection signal from the sensors described above and then the theft alarm mechanism 52 sounds an alarm and the ignition prohibiting mechanism 53 prohibits ignition.

Accordingly, the above described stealing action detection mechanism can respond to almost all stealing actions with reliability because it is provided with various kinds of sensors and even if a state of ignition-on occurs, the engine is not ignited to make it impossible to start the engine, thereby making it difficult to steal the vehicle.

The present invention produces the following effects by the above described constitution.

Since the theft detection mechanism of the vehicle comprises a top ring which is depressed when a foreign object other than the key is inserted into the key inserting hole and a sinking sensor for detecting that the top ring is depressed, the top ring is inevitably depressed when a foreign object other than the key is inserted into the key inserting hole to activate the sensor, thereby reliably detecting the stealing action. Moreover, this theft detection mechanism has a simple structure to reduce the cost thereof.

Since the anti-theft device for the vehicle comprises the theft detection mechanism of the vehicle and the theft alarm mechanism for sounding an alarm by a signal from the theft detection mechanism of the vehicle, it can make the stealing action known to surroundings by the theft alarm mechanism, thereby improving the effect of preventing theft.

Since the anti-theft device for the vehicle comprises the theft detection mechanism of the vehicle and the ignition prohibiting mechanism for prohibiting ignition by a signal from the theft detection mechanism of the vehicle, if the stealing action is detected, the engine cannot be started, thereby making it difficult to steal the vehicle.

Since the anti-theft device for the vehicle comprises the anti-theft detection mechanism for the vehicle and the ignition prohibiting mechanism for prohibiting ignition by a signal from the theft detection mechanism of the vehicle, if the stealing action is detected, the engine cannot be started, thereby making it difficult to steal the vehicle.

Since the anti-theft device for the vehicle comprises the theft detection mechanism of the vehicle and the stealing action detection mechanism provided with at least one of the vibration sensor, the ultrasonic sensor, infrared sensor and the electric circuit break detection circuit mounted on the body of the vehicle for detecting the stealing action, various kinds of stealing actions are reliably detected by the different functions of the various kinds of sensors.

Since the anti-theft device for the vehicle comprises the anti-theft detection mechanism for the vehicle and the theft alarm mechanism for sounding an alarm by a signal from the theft detection mechanism or the stealing action detection mechanism for the vehicle, the stealing actions can be reliably detected by the different functions of the various kinds of sensors and the theft preventing effects can be improved by the theft alarm mechanism.

Since the anti-theft device for the vehicle comprises the anti-theft detection mechanism for the vehicle and the ignition prohibiting mechanism for prohibiting ignition by a signal from the stealing action detection mechanism or the theft detection mechanism for the vehicle, if the stealing action is detected, the engine cannot be started, thereby making it difficult to steal the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A theft detection mechanism built into a handle lock device for use with a vehicle, said theft detection mechanism comprising:

a crankshaft mounted for axial sliding movement on said handle lock device, the crankshaft having tumblers mounted therein and a keyhole therethrough;

a top ring mounted for axial sliding movement on said handle lock device, said top ring being axially slidable with respect to said crankshaft;

a key inserting hole formed in said top ring; and a sensor operatively mounted between said top ring and said crankshaft with an axial separation between the top ring and the sensor, said sensor for detecting movement of said top ring, and wherein when an object other than a key, is inserted into said key inserting hole, the top ring slides axially, the axial sliding being detected by the sensor.

2. The theft detection mechanism for a vehicle according to claim 1, wherein said sensor includes a projection extending from said sensor and said top ring engages said projection to activate said sensor when said top ring is moved.

3. The theft detection mechanism for a vehicle according to claim 1, and further including biasing means for normally biasing said top ring to a position out of engagement with said sensor.

4. An anti-theft device for a vehicle comprising:
a theft detection mechanism built into a handle lock device adapted for use with the vehicle, said theft detection mechanism including a crankshaft mounted for axial sliding movement on said handle lock device, the crankshaft having tumblers mounted therein and a keyhole therethrough, a top ring mounted for axial sliding movement on said handle lock device, said top ring being axially slidable with respect to said crankshaft, a key inserting hole formed in said top ring and a sensor operatively mounted between said top ring and said crankshaft with an axial separation between the top ring and the sensor for detecting movement of said top ring, wherein when an object, other than a key, is inserted into said key inserting hole, the top ring slides axially, the axial sliding being detected by said sensor; and
a theft alarm mechanism for sounding an alarm based on a signal generated from said theft detection mechanism for a vehicle.

5. The anti-theft detection mechanism for a vehicle according to claim 4, wherein said sensor includes a projection extending from said sensor and said top ring engages said projection to activate said sensor when said top ring is moved.

6. The anti-theft detection mechanism for a vehicle according to claim 4, and further including biasing means for normally biasing said top ring to a position out of engagement with said sensor.

7. The anti-theft device for a vehicle according to claim 4, and further comprising an ignition prohibiting mechanism for prohibiting ignition based on a signal generated from said theft detection mechanism for a vehicle.

8. An anti-theft device for a vehicle comprising:
a theft detection mechanism built into a handle lock device adapted for use with the vehicle, said theft detection mechanism including a crankshaft mounted for axial sliding movement on said handle lock device, the crankshaft having tumblers mounted therein and a keyhole therethrough, a top ring mounted for axial sliding movement on said handle lock device, said top ring being axially slidable with respect to said crankshaft, a key inserting hole formed in said top ring, a sensor operatively mounted between said top ring and said crankshaft with an axial separation between the top ring and the sensor for detecting movement of said top ring, wherein when an object, other than a key, is inserted into said key inserting hole, the top ring slides axially, the axial sliding being detected by said sensor; and
an ignition prohibiting mechanism for prohibiting ignition based on a signal generated from said theft detection mechanism for a vehicle.

9. The anti-theft detection mechanism for a vehicle according to claim 8, wherein said sensor includes a projection extending from said sensor and said top ring engages said projection to activate said sensor when said top ring is depressed.

10. The anti-theft detection mechanism for a vehicle according to claim 8, and further including biasing means for normally biasing said top ring to a position out of engagement with said sensor.

11. An anti-theft device for a vehicle comprising:
a theft detection mechanism built into a handle lock device adapted for use with the vehicle, said theft detection mechanism including a crankshaft mounted for axial sliding movement on said handle lock device, the crankshaft having tumblers mounted therein and a keyhole therethrough, a top ring mounted for axial sliding movement on said handle lock device, said top ring being axially slidable with respect to said crankshaft, a key inserting hole formed in said top ring, and a sensor operatively mounted between said top ring and said crankshaft with an axial separation between the top ring and the sensor for detecting movement of said top ring, wherein when an object, other than a key, is inserted into said key inserting hole, the top ring slides axially, the axial sliding being detected by said sensor; and
a stealing action detection mechanism selected from the group consisting of a vibration sensor, an ultrasonic sensor, an infrared sensor and an electric circuit break detection sensor mounted on a body of the vehicle for detecting a stealing action.

12. The anti-theft device for a vehicle according to claim 11, and further comprising a theft alarm mechanism for sounding an alarm based on a signal generated from said theft detection mechanism or said stealing action detection mechanism.

13. The anti-theft device for a vehicle according to claim 11, and further comprising an ignition prohibiting mechanism for prohibiting ignition based on a signal generated from said stealing action detection mechanism or said theft detection mechanism for a vehicle.

14. The anti-theft detection mechanism for a vehicle according to claim 11, wherein said sensor includes a projection extending from said sensor and said top ring engages said projection to activate said sensor when said top ring is moved.

15. The anti-theft detection mechanism for a vehicle according to claim 11, and further including biasing means for normally biasing said top ring to a position out of engagement with said sensor.

16. The anti-theft device for a vehicle according to claim 12, and further comprising an ignition prohibiting mechanism for prohibiting ignition based on a signal generated from said stealing action detection mechanism or said theft detection mechanism for a vehicle.

17. The theft detection mechanism for a vehicle according to claim 1, wherein the crankshaft is mounted for axial movement away from the top ring.

18. The theft detection mechanism for a vehicle according to claim 4, wherein the crankshaft is mounted for axial movement away from the top ring.

19. The theft detection mechanism for a vehicle according to claim 8, wherein the crankshaft is mounted for axial movement away from the top ring.

20. The theft detection mechanism for a vehicle according to claim 11, wherein the crankshaft is mounted for axial movement away from the top ring.

* * * * *